(12) United States Patent
Watanabe et al.

(10) Patent No.: US 11,964,588 B2
(45) Date of Patent: Apr. 23, 2024

(54) VEHICLE COOLING STRUCTURE

(71) Applicant: TOYOTA JIDOSHA KABUSHIKI KAISHA, Aichi-ken (JP)

(72) Inventors: Toshio Watanabe, Toyota (JP); Keisuke Shibata, Miyoshi (JP); Kenta Miyahara, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 536 days.

(21) Appl. No.: 17/060,081

(22) Filed: Oct. 1, 2020

(65) Prior Publication Data

US 2021/0221253 A1 Jul. 22, 2021

(30) Foreign Application Priority Data

Jan. 22, 2020 (JP) .................................. 2020-008750

(51) Int. Cl.
*B60K 1/04* (2019.01)
*B60L 50/60* (2019.01)
(Continued)

(52) U.S. Cl.
CPC .............. *B60L 58/26* (2019.02); *B60L 50/66* (2019.02); *H01M 10/613* (2015.04); *H01M 10/625* (2015.04); *H01M 10/6551* (2015.04); *B60K 2001/005* (2013.01); *B60L 2240/36* (2013.01); *B60L 2240/662* (2013.01)

(58) Field of Classification Search
CPC .... B60L 50/66; B60L 58/26; B60K 2001/005; H01M 10/613; H01M 10/625; B60K 2240/36
See application file for complete search history.

(56) References Cited

U.S. PATENT DOCUMENTS 5,756,227 A * 5/1998 Suzuki ................ H01M 10/625
429/62
11,143,089 B2 * 10/2021 Wolf ...................... B60K 11/04
(Continued)

FOREIGN PATENT DOCUMENTS

CN 108189640 A 6/2018
JP H713547 U 3/1995
(Continued)

OTHER PUBLICATIONS

Notice of Allowance in U.S. Appl. No. 18/306,243, mailed Nov. 13, 2023, 23pp.

(Continued)

*Primary Examiner* — Jason D Shanske
*Assistant Examiner* — James J Triggs
(74) *Attorney, Agent, or Firm* — HAUPTMAN HAM, LLP (57) ABSTRACT

A battery provided in a vehicle and configured to supply electric power is cooled down by coolant the heat of which is exchanged with the heat of external air by a radiator. The radiator is provided near the battery and performs heat-exchange between the coolant and the external air taken in through introduction holes provided on a bottom face of the vehicle. Thus, even in a case where the radiator is provided in a vehicle floor portion so that the battery is upsized, it is possible to restrain a coolant pipe from being elongated. This accordingly makes it possible to improve mountability to the vehicle.

18 Claims, 8 Drawing Sheets

(51) Int. Cl.
    *B60L 58/26*     (2019.01)
    *H01M 10/613*     (2014.01)
    *H01M 10/625*     (2014.01)
    *H01M 10/6551*     (2014.01)
    *B60K 1/00*     (2006.01)

(56) References Cited

U.S. PATENT DOCUMENTS

2018/0029463 A1*   2/2018   Ajisaka .................. B60K 11/04
2019/0092118 A1    3/2019   Lee et al.

FOREIGN PATENT DOCUMENTS

| JP | 2005193748 A | 7/2005 |
| JP | 201816282 A | 2/2018 |
| WO | 2014055503 A2 | 4/2014 |

OTHER PUBLICATIONS

Office Action in U.S. Appl. No. 18/306,240, mailed Nov. 16, 2023, 24pp.
Notice Of Allowance in U.S. Appl. No. 18/306,240, mailed Feb. 9, 2024, 9pp.

* cited by examiner

VEHICLE COOLING STRUCTURE

CROSS-REFERENCE TO RELATED APPLICATION

This application claims priority to Japanese Patent Application No. 2020-008750 filed on Jan. 22, 2020, incorporated herein by reference in its entirety.

BACKGROUND

1. Technical Field

The present disclosure relates to a vehicle cooling structure.

2. Description of Related Art

WO 2014/055503 describes an disclosure related to a cooling structure for an electric vehicle. In the cooling structure, heat-exchange is performed between coolant and external air by a radiator provided in a vehicle front portion. The coolant circulates through a battery and an electric machine provided in the vehicle. Hereby, cooling of the battery and the electric machine is performed.

SUMMARY

In the meantime, in recent years, extension in the cruising distance of an electric vehicle has been demanded, and it is necessary to upsize a battery unit so as to correspond to this demand. In the upsizing of the battery unit, it is conceivable that a battery is provided in a vehicle floor portion where a space can be easily secured. However, in this case, a pipe for coolant from a radiator to the battery is elongated. This might cause poor mountability of a cooling structure to a vehicle, and therefore, there is still room for improvement in the related art in this point.

The present disclosure is achieved in consideration of the above fact, and an object of the present disclosure is to provide a vehicle cooling structure that is improved in mountability to a vehicle.

A vehicle cooling structure according to a first aspect of the present disclosure includes: a power supply portion provided in a vehicle and configured to supply electric power; and a heat exchanger provided near the power supply portion and including a heat-exchanging portion formed into a wall shape, the heat-exchanging portion being configured to perform heat-exchange between coolant for cooling down the power supply portion and external air taken in through introduction holes provided on a bottom face of the vehicle.

In the disclosure according to the first aspect, the power supply portion provided in the vehicle and configured to supply electric power is cooled down by the coolant the heat of which is exchanged with the heat of the external air by the heat exchanger. The heat exchanger is provided near the power supply portion and performs heat-exchange between the coolant and the external air taken in through the introduction holes provided on the bottom face of the vehicle. Hereby, even in a case where the heat exchanger is provided in a vehicle floor portion so that the power supply portion is upsized, it is possible to restrain a pipe for the coolant from being elongated.

The vehicle cooling structure according to a second aspect of the present disclosure may be configured as follows. That is, in the vehicle cooling structure according to the first aspect, the power supply portion may supply electric power to an electric machine provided in the vehicle and configured to drive the vehicle, and the heat exchanger may perform heat-exchange between the external air and the coolant that cools down the electric machine as well as the power supply portion.

In the disclosure according to the second aspect, the power supply portion supplies electric power to the electric machine provided in the vehicle and configured to drive the vehicle. Further, the heat exchanger performs heat-exchange between the external air and the coolant that cools down the electric machine as well as the power supply portion, so that it is not necessary to provide another heat exchanger for cooling the electric machine and another coolant pipe connected thereto.

The vehicle cooling structure according to a third aspect of the present disclosure may be configured as follows. That is, in the vehicle cooling structure according to the first or second aspect, the power supply portion and the heat exchanger may be placed inwardly in the vehicle width direction from a pair of right and left frame members constituting a framework of the vehicle and extending in a vehicle front-rear direction.

In the disclosure according to the third aspect, the power supply portion and the heat exchanger are provided inwardly in the vehicle width direction from the right and left frame members constituting the framework of the vehicle and extending in the vehicle front-rear direction. Accordingly, it is possible to restrain, by the right and left frame members, such a situation that a collision load is directly input into the power supply portion and the heat exchanger at the time when the vehicle has a collision to its side face (hereinafter just referred to as a "lateral collision").

The vehicle cooling structure according to a fourth aspect of the present disclosure may be configured as follows. That is, in the vehicle cooling structure according to any one of the first to third aspects, the heat exchanger may be formed integrally with the power supply portion.

In the disclosure according to the fourth aspect, since the heat exchanger is formed integrally with the power supply portion, it is possible to reduce the number of man-hour for mounting of components to the vehicle.

The vehicle cooling structure according to a fifth aspect of the present disclosure may be configured as follows. That is, the vehicle cooling structure according to any one of the first to fourth aspects may include: shutter fins configured to open and close the introduction holes; and a controlling portion configured to control the opening and closing of the shutter fins.

In the disclosure according to the fifth aspect, the vehicle cooling structure includes the shutter fins configured to open and close the introduction holes, and the controlling portion configured to control the opening and closing of the shutter fins. Accordingly, in a case where cooling of at least the power supply portion is unnecessary, when the controlling portion controls the shutter fins such that the introduction holes are closed, it is possible to restrain a decrease in aerodynamic performance due to entrance of the external air into the introduction holes.

The vehicle cooling structure according to a sixth aspect of the present disclosure may be configured as follows. That is, in the vehicle cooling structure according to the fifth aspect, the controlling portion may detect a traveling direction of the vehicle and control the opening and closing of the shutter fins so that the external air is introduced into the introduction holes in the traveling direction thus detected.

In the disclosure according to the sixth aspect, the controlling portion controls the opening and closing of the shutter fins so that the external air is introduced into the introduction holes in a current traveling direction of the vehicle. Hereby, even in a case where the vehicle travels to either side in the vehicle front-rear direction, it is possible to perform heat-exchange between the coolant and the external air by introducing the external air into the introduction holes. That is, even in a case where the vehicle travels to either side in the vehicle front-rear direction, the power supply portion can be cooled down.

The vehicle cooling structure according to a seventh aspect of the present disclosure may be configured as follows. That is, in the vehicle cooling structure according to any one of the first to sixth aspects, the heat-exchanging portion may be placed along the horizontal direction in the heat exchanger. The heat exchanger may include: an inclined portion configured to incline the heat exchanger around the axial direction of the heat exchanger, the axial direction being along a vehicle width direction; and an inclination controlling portion configured to control the inclined portion such that the heat exchanger is inclined downward in the vehicle up-down direction toward the rear side in the vehicle front-rear direction under a predetermined condition.

In the disclosure according to the seventh aspect, the heat exchanger includes: the inclined portion configured to incline, around the axial direction, the heat exchanger in which the heat-exchanging portion having a wall shape is placed along the horizontal direction, the axial direction being along the vehicle width direction; and the inclination controlling portion configured to control the inclined portion such that the heat exchanger is inclined downward in the vehicle up-down direction toward the rear side in the vehicle front-rear direction under the predetermined condition. That is, the direction of the heat-exchanging portion nears a direction perpendicular to the direction of the external air when the vehicle travels forward in the vehicle front-rear direction. Accordingly, by inclining the heat exchanger when cooling is necessary, a more amount of the external air hits the heat-exchanging portion of the heat exchanger while the vehicle travels, thereby making it possible to perform heat-exchange efficiently.

The vehicle cooling structure according to an eighth aspect of the present disclosure may be configured as follows. That is, in the vehicle cooling structure according to the seventh aspect, the inclination controlling portion may detect a traveling direction of the vehicle. The inclination controlling portion may control the inclined portion such that the heat exchanger is inclined downward in the vehicle up-down direction toward the rear side in the traveling direction thus detected.

In the disclosure according to the eighth aspect, the inclination controlling portion controls the inclined portion such that the heat exchanger is inclined downward in the vehicle up-down direction toward the rear side in the detected traveling direction. Hereby, even when the traveling direction changes, a more amount of the external air can hit the heat exchanger by inclining the heat exchanger while the vehicle travels. That is, even in a case where the vehicle travels to either side in the vehicle front-rear direction, it is possible to perform heat-exchange efficiently.

The vehicle cooling structure according to the first aspect has such an excellent effect that mountability to the vehicle can be improved.

The vehicle cooling structure according to the second and fourth aspects has such an excellent effect that the mountability to the vehicle can be improved more.

The vehicle cooling structure according to the third aspect has such an excellent effect that collision performance at the time of a lateral collision can be secured.

The vehicle cooling structure according to the fifth aspect has such an excellent effect that a decrease in aerodynamic performance of the vehicle can be restrained when cooling is unnecessary.

The vehicle cooling structure according to the sixth aspect has such an excellent effect that cooling is performable regardless of the traveling direction of the vehicle.

The vehicle cooling structure according to the seventh aspect has such an excellent effect that cooling performance can be improved.

The vehicle cooling structure according to the eighth aspect has such an excellent effect that the cooling performance can be improved regardless of the traveling direction of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

In FIGS. 1 to 8, an arrow FR indicates the front side in the vehicle front-rear direction, an arrow OUT indicates the outer side in the vehicle width direction, and an arrow UP indicates the upper side in the vehicle up-down direction.

First Embodiment

Figure 1:
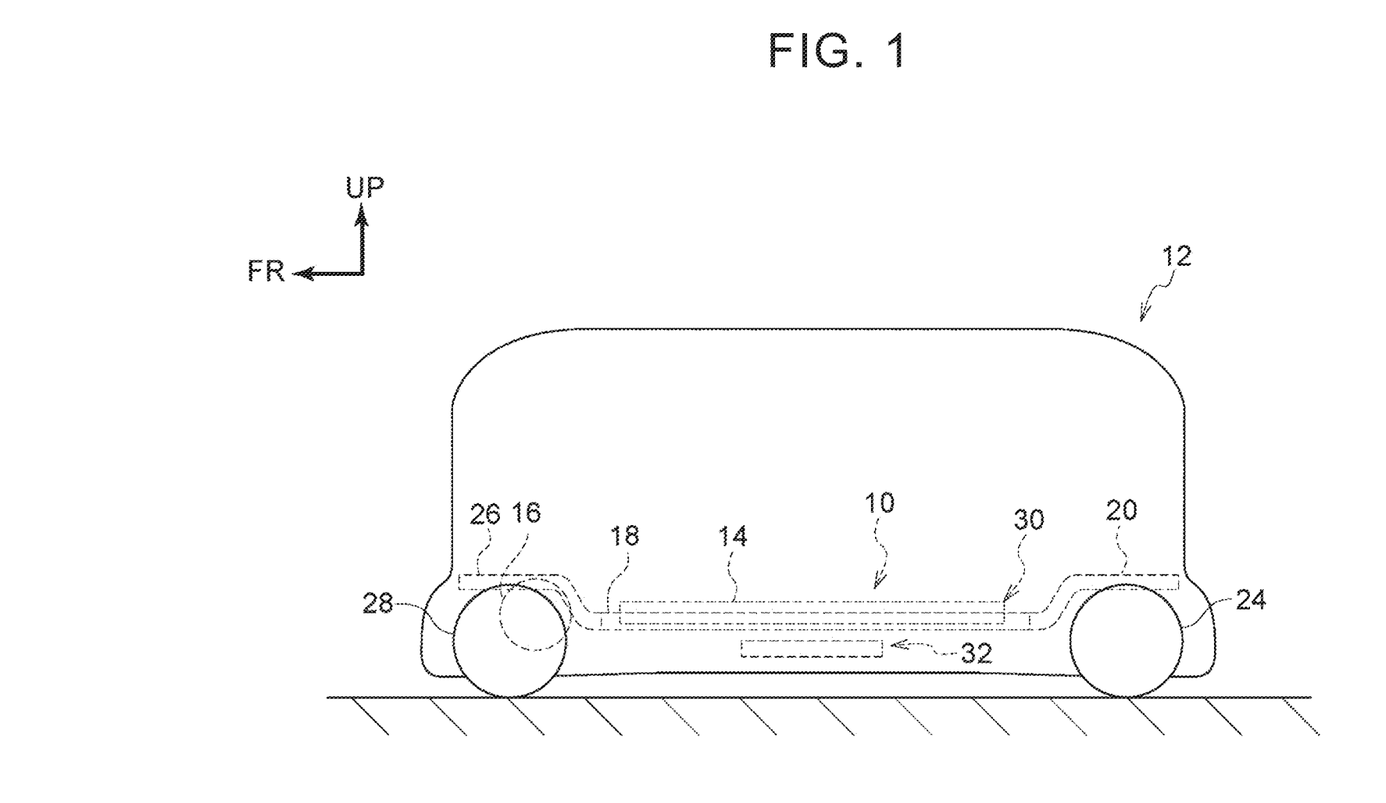
FIG. 1 is a side view illustrating a vehicle having a vehicle cooling structure according to a first embodiment.
Figure 2:
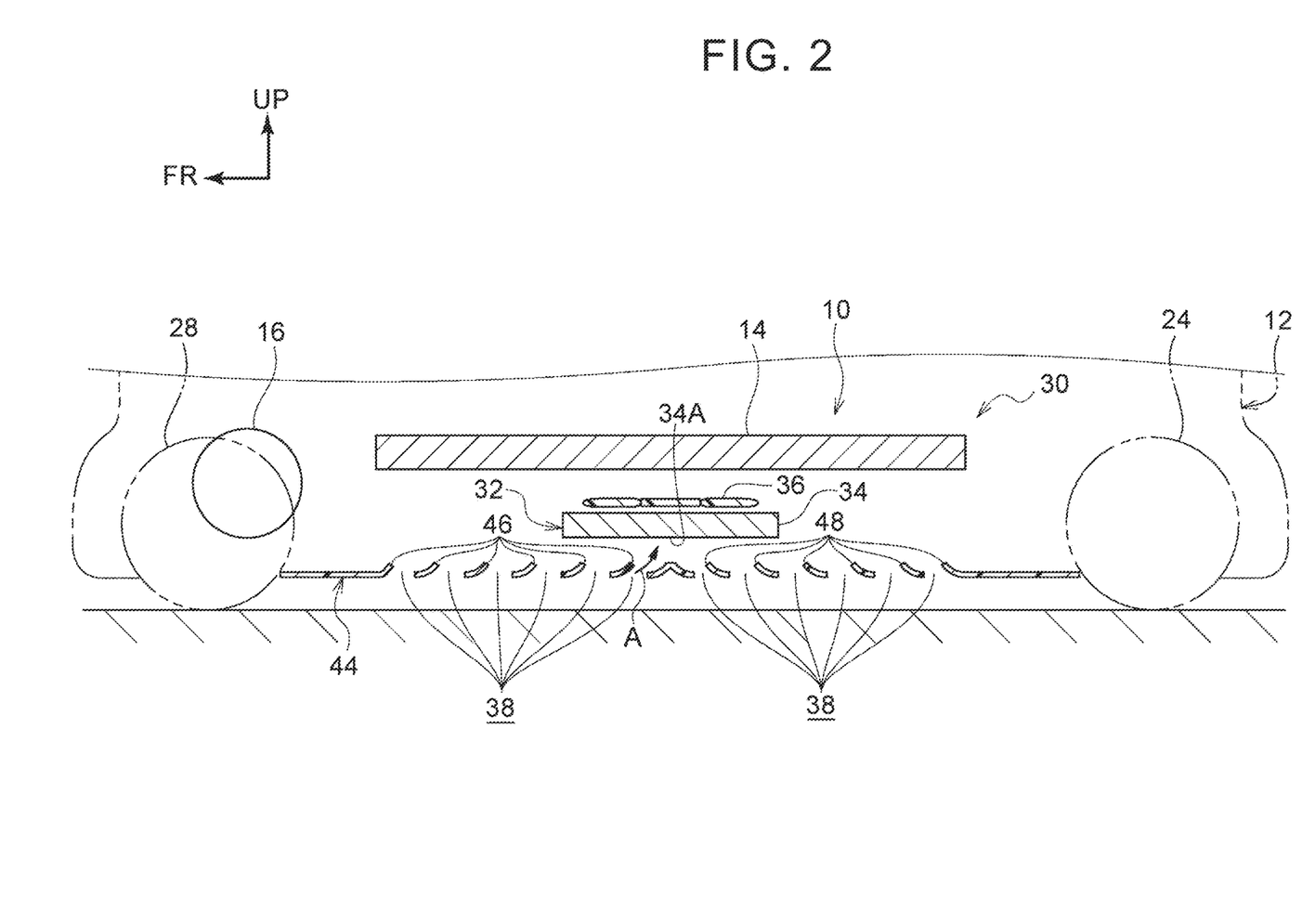
FIG. 2 is a schematic sectional view illustrating a state where an essential part of the vehicle cooling structure according to the first embodiment is cut along the vehicle front-rear direction.
Figure 3:
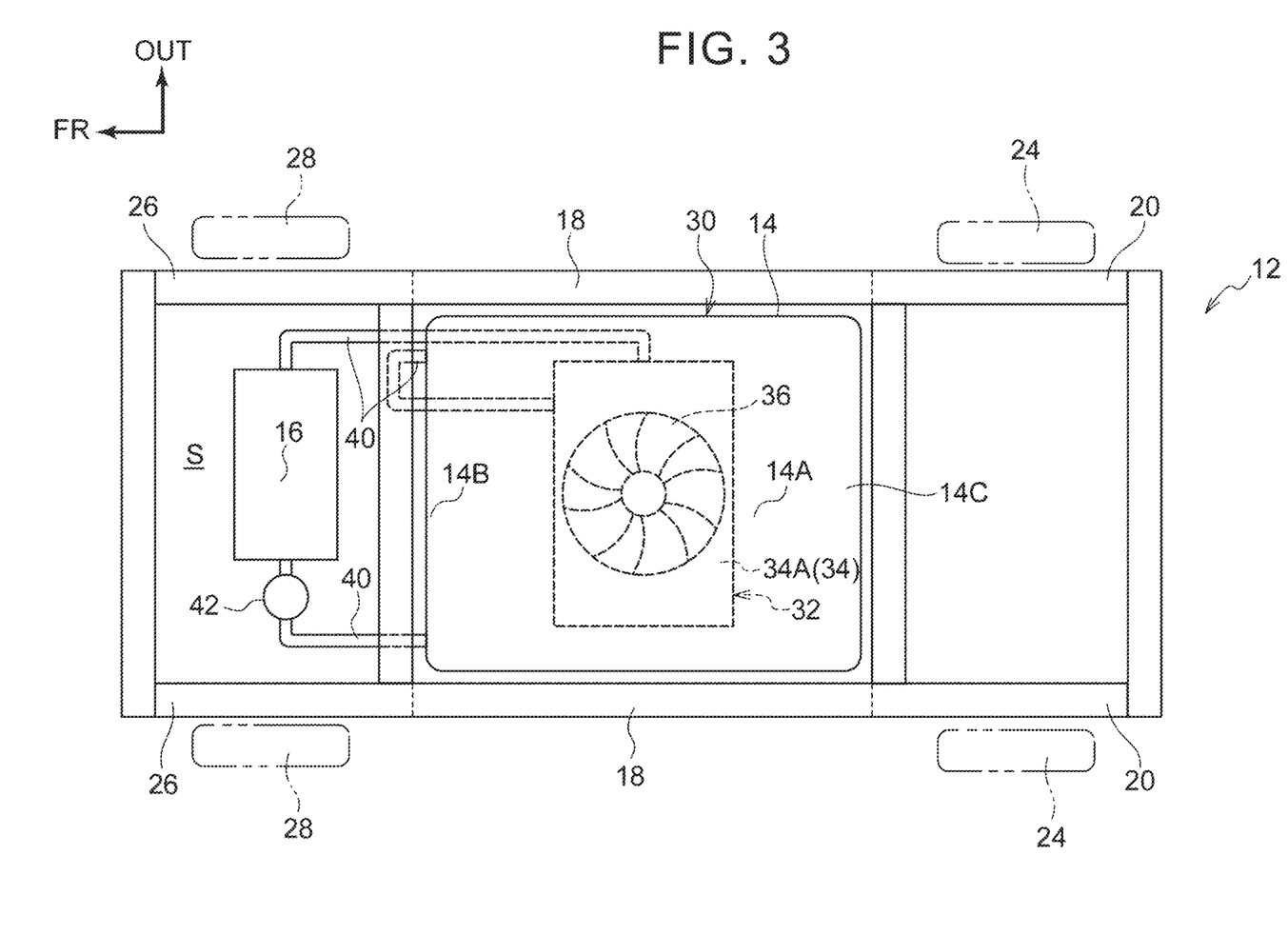
FIG. 3 is a schematic plan view illustrating a state where the essential part of the vehicle cooling structure according to the first embodiment is viewed from above in the vehicle up-down direction.

With reference to FIGS. 1 to 3, the following describes a first embodiment of a vehicle cooling structure according to the present disclosure.

Overall Configuration

As illustrated in FIG. 1, a vehicle 12 to which a vehicle cooling structure 10 is applied is an electric vehicle configured to travel by a motor unit 16 as an electric machine driven upon receipt of supply of electric power from a battery 14 as a power supply portion (described later). The vehicle 12 of the present embodiment has an appearance in which the appearance of a first side of the vehicle 12 in the vehicle front-rear direction and the appearance of a second side of the vehicle 12 in the vehicle front-rear direction are generally the same, and the vehicle 12 can continuously travel toward either side in the vehicle front-rear direction. Note that, for purpose of this description, the first side in the vehicle front-rear direction is referred to as the front side in the vehicle front-rear direction, and the second side in the vehicle front-rear direction is referred to as the rear side in the vehicle front-rear direction.

Rocker

As illustrated in FIG. 3, a pair of right and left rockers 18 as frame members extending in the vehicle front-rear direction is provided such that the right and left rockers 18 are placed on respective outer sides, in the vehicle width direction, relative to a floor panel (not shown) constituting part of a floor portion of the vehicle 12. A terminal portion of the floor panel is joined to upper parts of the rockers 18 by spot welding.

A pair of right and left rear side members 20 is provided such that the right and left rear side members 20 are connected to respective rear end parts of the right and left rockers 18. The right and left rear side members 20 are placed between a pair of right and left rear wheels 24, and a rear suspension member (not shown) is attached to the rear side members 20 in a suspended manner. A suspension, a suspension arm, a stabilizer (all not shown herein), and so on by which each of the right and left rear wheels 24 is suspended are attached to the rear suspension member.

A pair of right and left front side members 26 is provided such that the right and left front side members 26 are connected to respective front end parts of the right and left rockers. The right and left front side members 26 are placed between a pair of right and left front wheels 28, and a front suspension member (not shown) is attached to the front side members 26 in a suspended manner. A suspension, a suspension arm, a stabilizer (all not shown herein), and so on by which each of the right and left front wheels 28 is suspended are attached to the front suspension member.

Motor Unit

The motor unit 16 is placed in a space S between the front side members 26. The motor unit 16 is placed between the right and left front side members 26 and is attached to a top face of the front suspension member via a support mount (not shown) constituted by an elastic member. The motor unit 16 can rotate the right and left front wheels 28 via output shafts (not shown).

A water jacket (not shown) is provided inside the motor unit 16. Coolant (not shown) is filled in the water jacket, and heat-exchange is performed between the motor unit 16 and the coolant. Hereby, the temperature of the motor unit 16 at the time of operation is maintained within a predetermined allowable range.

Battery

A battery unit 30 is provided in a vehicle floor portion, that is, below the floor panel in the vehicle up-down direction and between the right and left rockers 18. The battery unit 30 includes the battery 14 and a radiator unit 32 (see FIG. 2). The battery 14 includes a case 14A formed in a generally box shape and cells (not shown) accommodated in the case 14A. A front end part 14B of the battery 14 is placed on rear end sides of the front side members 26, and a rear end part 14C of the battery 14 is placed on front end sides of the rear side members 20. The battery 14 is electrically connected to the motor unit 16 via a harness (not shown), and the battery 14 supplies electric power to the motor unit 16.

A water jacket (not shown) is provided inside the battery 14 such that the water jacket surrounds the cells. Coolant (not shown) is filled in the water jacket, and heat-exchange is performed between the battery 14 and the coolant. Hereby, the temperature of the battery 14 at the time of power supply is maintained within a predetermined allowable range.

Radiator Unit

As illustrated in FIG. 2, the radiator unit 32 includes a radiator 34 as a heat exchanger and an air-blow fan 36. Coolant is circulatable through the inside of the radiator 34. The radiator 34 includes a heat-exchanging portion 34A formed in a wall shape and placed horizontally. The heat-exchanging portion 34A is configured to perform heat-exchange between the coolant and external air A taken in through introduction holes 38 (described later) so as to flow toward the upper side in the vehicle up-down direction from the lower side in the vehicle up-down direction. By the heat-exchanging portion 34A, heat of the coolant is released.

The air-blow fan 36 is provided above the radiator 34 in the vehicle up-down direction, and in operation, the air-blow fan 36 generates airflow from the lower side in the vehicle up-down direction to the upper side in the vehicle up-down direction. The air-blow fan 36 is integrally formed with the radiator 34 via a fan shroud (not shown).

The radiator 34, the battery 14, and the motor unit 16 are connected to each other via coolant pipes 40 as illustrated in FIG. 3. More specifically, the coolant pipes 40 connect the radiator 34, the battery 14, and the motor unit 16 such that the coolant is circulatable through the inside of the radiator 34, the inside of the water jacket of the battery 14, and the inside of the water jacket of the motor unit 16. Further, the coolant pipe 40 is connected to a water pump 42. The water pump 42 circulates the coolant by sending off the coolant in the coolant pipe 40.

The radiator unit 32 and the battery 14 are formed integrally in a state where the radiator unit 32 is distanced from the battery 14 by a holding member (not shown) in the vehicle up-down direction. Note that the radiator unit 32 is placed at a position corresponding to generally the center of the battery 14 in the vehicle front-rear direction and generally the center thereof in the vehicle width direction in a plan view of the vehicle.

Introduction Holes

As illustrated in FIG. 2, an under panel 44 is provided in the vehicle floor portion, that is, below the battery unit 30 in the vehicle up-down direction. The under panel 44 is constituted by a resin plate member with its plate-thickness direction being along the vehicle up-down direction, for example. The under panel 44 is attached to the vehicle 12 via a fastener (not shown). A plurality of introduction holes 38 formed to penetrate through the under panel 44 in the plate-thickness direction is formed in the under panel 44 at a position corresponding to the battery unit 30. Further, wind-guide inclined portions 46, 48 are formed in part of edges of the introduction holes 38. The wind-guide inclined portions 46 are provided in front edges of the introduction holes 38 in the vehicle front-rear direction, the introduction holes 38 being formed in the under panel 44 in a range ahead of a position in the vehicle front-rear direction, the position corresponding to a generally central part of the battery unit 30 in the vehicle front-rear direction. The wind-guide inclined portions 46 incline upward in the vehicle up-down direction toward the rear side in the vehicle front-rear direction. Accordingly, the external air A entering the introduction holes 38 when the vehicle 12 travels forward in the vehicle front-rear direction flows toward the radiator 34 side along the wind-guide inclined portions 46. In the meantime, the wind-guide inclined portions 48 are provided in rear edges of the introduction holes 38 in the vehicle front-rear direction, the introduction holes 38 being formed in the under panel 44 in a range behind the position in the vehicle front-rear direction, the position corresponding to the generally central part of the battery unit 30 in the vehicle front-rear direction. The wind-guide inclined portions 48 incline upward in the vehicle up-down direction toward the front side in the vehicle front-rear direction. Accordingly, the external air A entering the introduction holes 38 when the vehicle 12 travels rearward in the vehicle front-rear direction flows toward the radiator 34 side along the wind-guide inclined portions 48.

Operations and Effects of First Embodiment

Next will be described operations and effects of the present embodiment.

In the present embodiment, as illustrated in FIG. 2, the battery 14 provided in the vehicle 12 and configured to supply electric power is cooled down by the coolant the heat of which is exchanged with the heat of the external air A by the radiator 34. The radiator 34 is provided near the battery 14 and performs heat-exchange between the coolant and the external air A taken in through the introduction holes 38 provided on the bottom face of the vehicle 12. Accordingly, even in a case where the radiator 34 is provided in the vehicle floor portion so that the battery 14 is upsized, it is possible to restrain the coolant pipe 40 from being elongated. This accordingly makes it possible to improve mountability to the vehicle 12.

Further, the battery 14 supplies electric power to the motor unit 16 provided in the vehicle 12 and configured to drive the vehicle 12. The radiator 34 performs heat-exchange between the external air A and the coolant that cools down the motor unit 16 as well as the battery 14, so that it is not necessary to provide another radiator 34 for cooling the motor unit 16 and another coolant pipe 40 connected thereto.

Further, the radiator 34 is formed integrally with the battery 14, and therefore, the number of man-hour for mounting components to the vehicle 12 can be reduced. This can further improve the mountability to the vehicle 12.

Further, the battery 14 and the radiator 34 are provided inwardly in the vehicle width direction from the right and left rockers 18 constituting the framework of the vehicle 12 and extending in the vehicle front-rear direction. Accordingly, it is possible to restrain, by the right and left rockers 18, such a situation that a collision load is directly input into the battery 14 and the radiator 34 at the time of a lateral collision. Hereby, it is possible to secure collision performance in a lateral collision.

Second Embodiment

Next will be described a vehicle cooling structure according to a second embodiment of the present disclosure with reference to FIGS. 4 to 6. Note that a constituent that is basically the same as a constituent described in the first embodiment has the same reference sign as the constituent in the first embodiment, and the description thereof is omitted.

Figure 4:
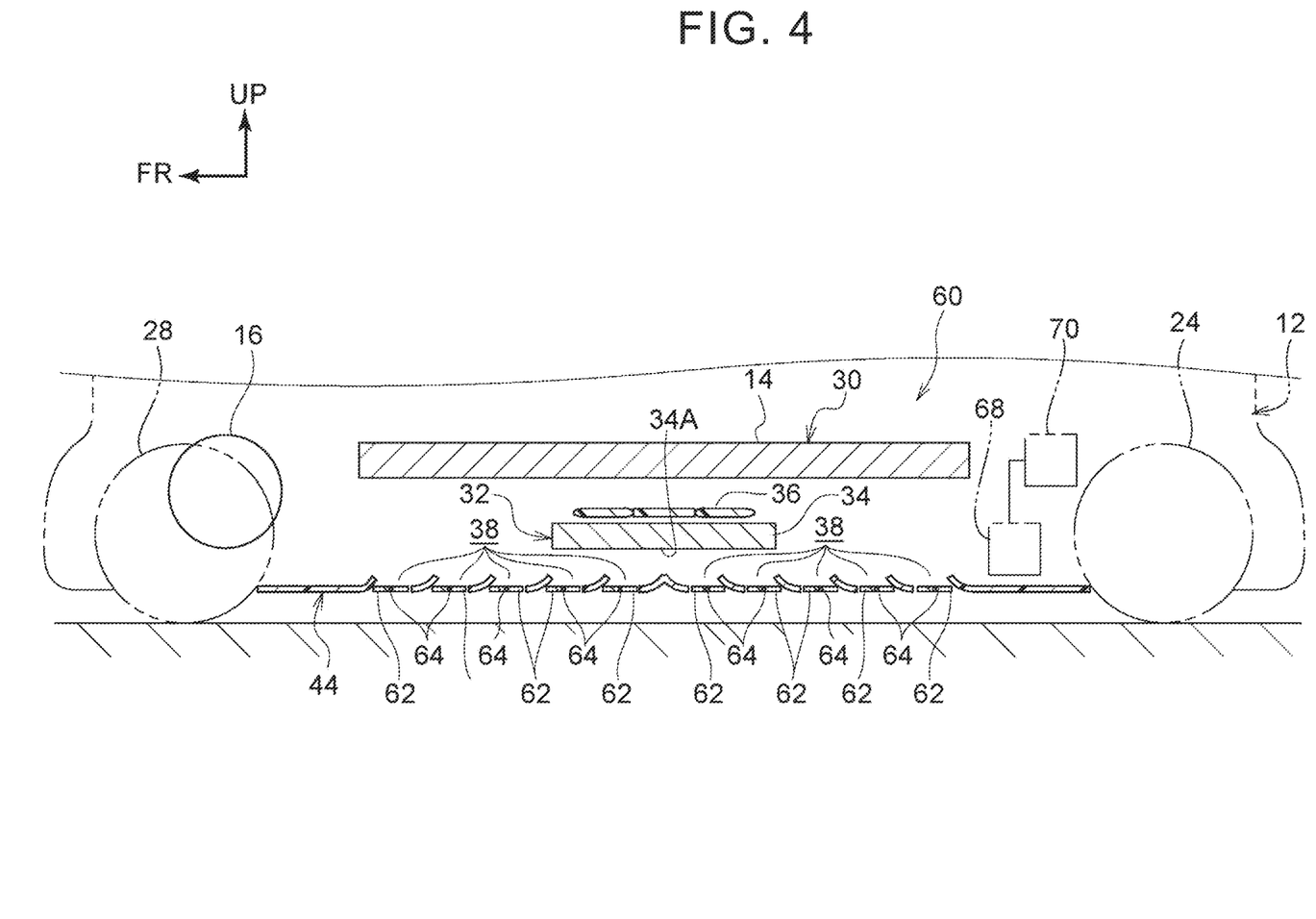
FIG. 4 is a schematic sectional view illustrating a state where an essential part of a vehicle cooling structure according to a second embodiment is cut along the vehicle front-rear direction.

As illustrated in FIG. 4, a basic configuration of a vehicle cooling structure 60 according to the second embodiment is similar to that in the first embodiment, and the vehicle cooling structure 60 has a feature in that shutter fins 62 are provided in the introduction holes 38.

That is, the shutter fin 62 is provided in an opening of the introduction hole 38 and is constituted by a plate member with its plate-thickness direction being along the vehicle up-down direction. A pivot shaft 64 with its axial direction being along the vehicle width direction is provided in a central part of the shutter fin 62 in the vehicle front-rear direction, and the shutter fin 62 can pivot around the pivot shaft 64. The pivoting of the shutter fin 62 is performed via a link member (not shown) that connects the shutter fin 62 to an actuator 68 when the actuator 68 operates.

Figure 5:
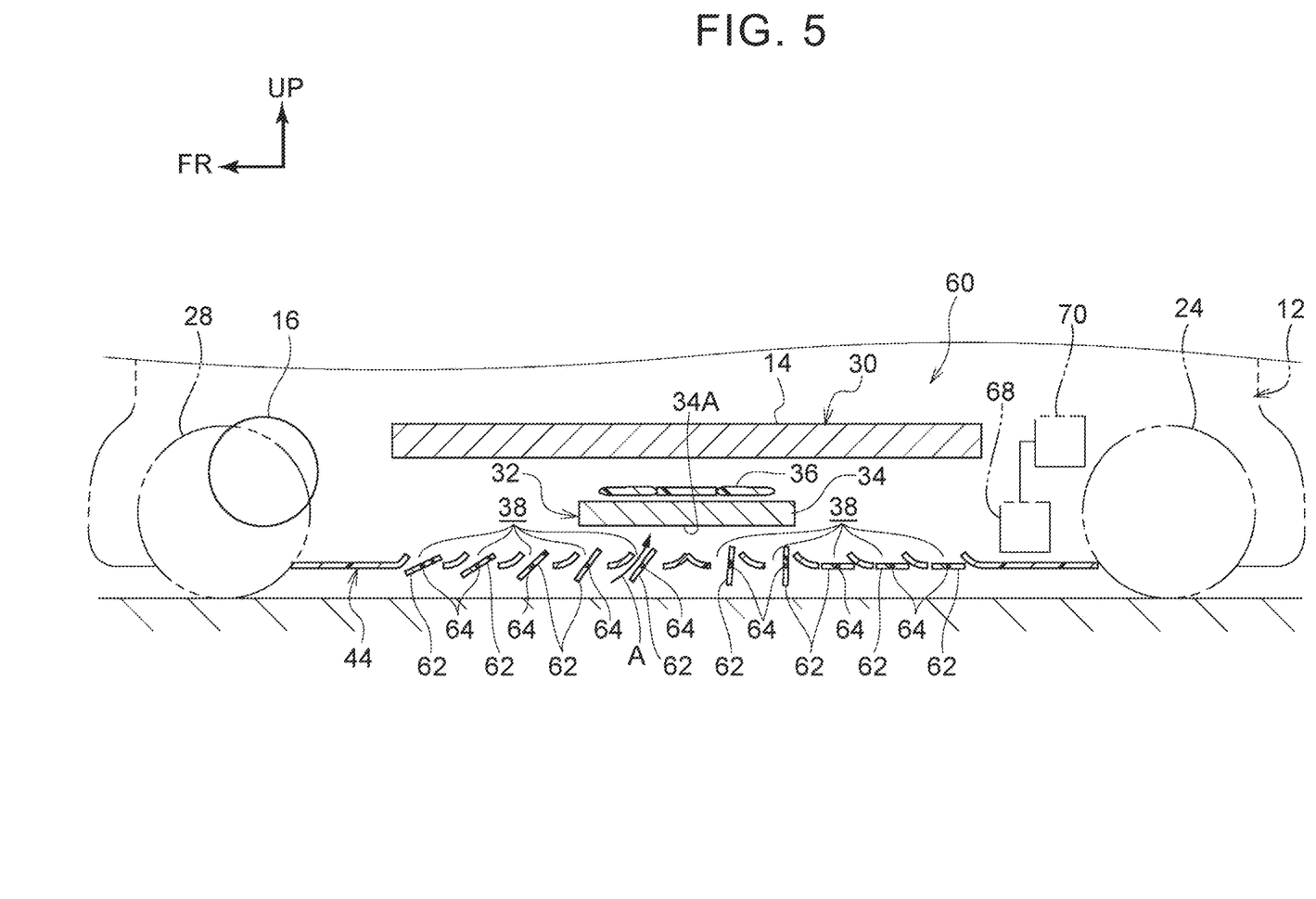
FIG. 5 is a schematic sectional view illustrating a case where a vehicle having the vehicle cooling structure according to the second embodiment travels toward a first side in the vehicle front-rear direction.
Figure 6:
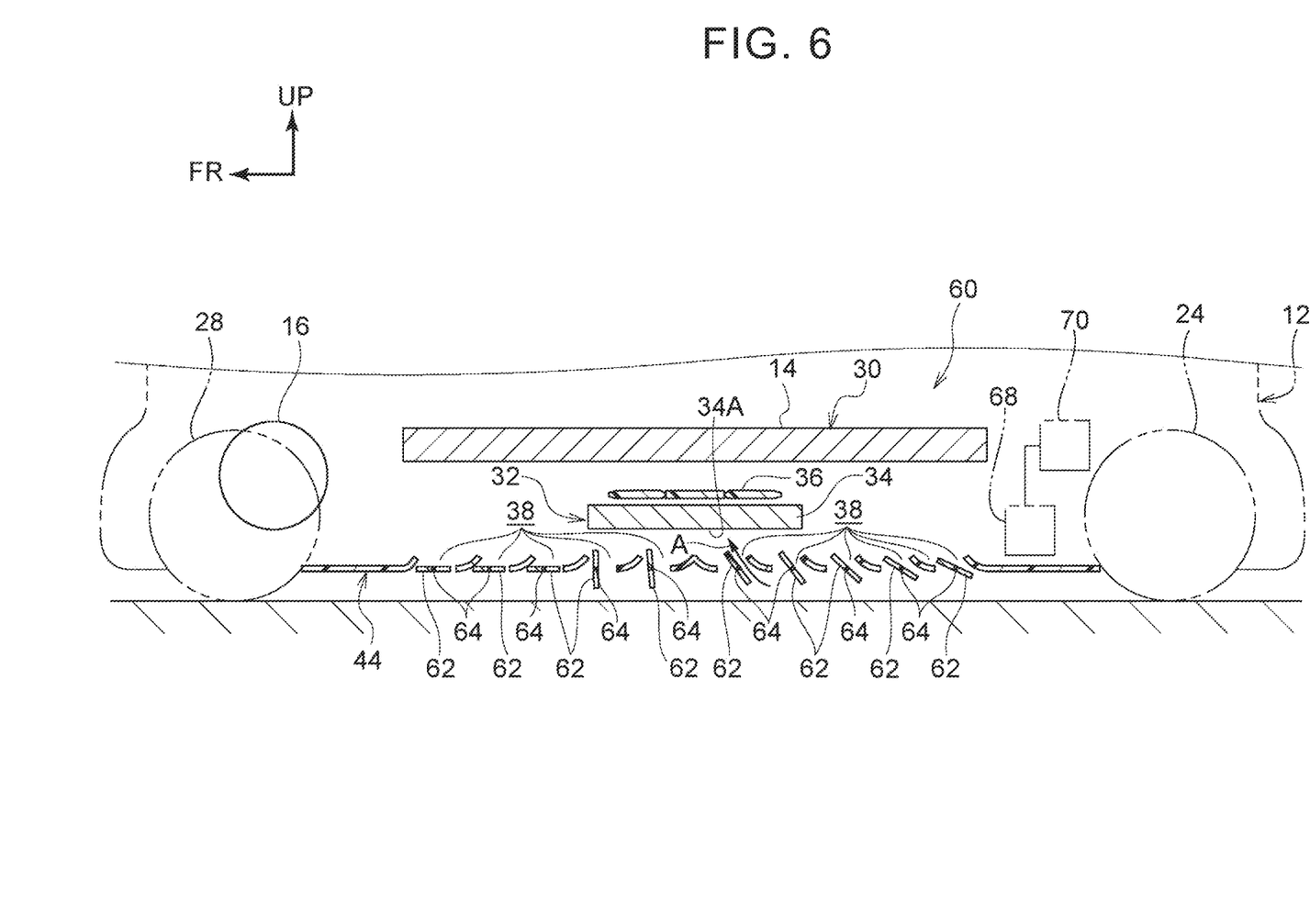
FIG. 6 is a schematic sectional view illustrating a case where the vehicle having the vehicle cooling structure according to the second embodiment travels toward a second side in the vehicle front-rear direction.

The actuator 68 is communicably connected to a controlling portion 70, and the controlling portion 70 controls the actuator 68 such that the shutter fin 62 is changed between a closed state and an opened state (see FIGS. 5 and 6). Further, the controlling portion 70 is communicably connected to a driving shaft rotation number sensor (not shown), and the controlling portion 70 determines to which side in the vehicle front-rear direction the vehicle 12 travels. Further, the controlling portion 70 is communicably connected to respective temperature sensors configured to detect respective temperatures of the battery 14 and the motor unit 16 and acquires the temperatures of the battery 14 and the motor unit 16.

Control of Shutter Fins

When at least one of the temperatures of the battery 14 and the motor unit 16 is a predetermined temperature or less, the controlling portion 70 determines that cooling is unnecessary and controls the actuator 68 such that the shutter fins 62 are brought into the closed state. Hereby, the introduction holes 38 are closed.

In the meantime, when a predetermined condition is satisfied, that is, at least one of the temperatures of the battery 14 and the motor unit 16 is the predetermined temperature or more, the controlling portion 70 determines that cooling is necessary and controls the actuator 68 such that the shutter fins 62 are brought into the opened state. More specifically, in a case where the vehicle 12 travels forward in the vehicle front-rear direction, the controlling portion 70 brings the shutter fins 62 into the opened state except the shutter fins 62 placed behind the radiator 34 in the vehicle front-rear direction among the shutter fins 62, as illustrated in FIG. 5, such that the shutter fins 62 are inclined upward in the vehicle up-down direction toward the rear side in the vehicle front-rear direction. Hereby, the external air A outside the vehicle 12 traveling forward in the vehicle front-rear direction as a traveling direction is smoothly introduced into the introduction holes 38 along the shutter fins 62. Note that, in a case where the vehicle 12 travels forward in the vehicle front-rear direction, in the present embodiment, the shutter fins 62 placed behind the radiator 34 in the vehicle front-rear direction among the shutter fins 62 are in the closed state. However, the present disclosure is not limited to this, and the shutter fins 62 placed behind the radiator 34 in the vehicle front-rear direction among the shutter fins 62 may be in the opened state.

Further, in a case where the vehicle 12 travels rearward in the vehicle front-rear direction, the controlling portion 70 brings the shutter fins 62 into the opened state except the shutter fins 62 placed in front of the radiator 34 in the vehicle front-rear direction among the shutter fins 62, as illustrated in FIG. 6, such that the shutter fins 62 are inclined downward in the vehicle up-down direction toward the rear side in the vehicle front-rear direction. Hereby, the external air A outside the vehicle 12 traveling rearward in the vehicle front-rear direction as a traveling direction is smoothly introduced into the introduction holes 38 along the shutter fins 62. Note that, in a case where the vehicle 12 travels rearward in the vehicle front-rear direction, in the present embodiment, the shutter fins 62 placed in front of the radiator 34 in the vehicle front-rear direction among the shutter fins 62 are in the closed state. However, the present disclosure is not limited to this, and the shutter fins 62 placed in front of the radiator 34 in the vehicle front-rear direction among the shutter fins 62 may be in the opened state.

Operations and Effects of Second Embodiment

Next will be described operations and effects of the present embodiment.

The vehicle cooling structure 60 is configured in a similar manner to the vehicle cooling structure 10 of the first embodiment except that the shutter fins 62 are provided in the introduction holes 38. Accordingly, this configuration can yield the same effect as that of the first embodiment. Further, the vehicle cooling structure 60 includes the shutter fins 62 configured to open and close the introduction holes 38, and the controlling portion 70 configured to control the opening and closing of the shutter fins 62. Accordingly, in a case where cooling of at least the battery 14 is unnecessary, when the controlling portion 70 controls the shutter fins 62 so that the introduction holes 38 are closed, it is possible to restrain a decrease in aerodynamic performance due to entrance of the external air A into the introduction holes 38. This makes it possible to restrain the decrease in aerodynamic performance of the vehicle 12 at the time when cooling is unnecessary. Further, in a case where cooling is unnecessary, the shutter fins 62 close the introduction holes 38, so that it is possible to reduce such a situation that foreign matter hits the radiator 34.

Further, the controlling portion 70 controls the opening and closing of the shutter fins 62 so that the external air A is introduced into the introduction holes 38 in a current traveling direction of the vehicle 12. Even in a case where the vehicle 12 travels to either side in the vehicle front-rear direction, it is possible to perform heat-exchange between the coolant and the external air A by introducing the external air A into the introduction holes 38. That is, even in a case where the vehicle 12 that can travel to either side in the vehicle front-rear direction travels to either side in the vehicle front-rear direction, the battery 14 can be cooled down. Hereby, the battery 14 can be cooled down regardless of the traveling direction of the vehicle 12.

Note that, in the second embodiment, the controlling portion 70 is configured to perform a control such that the inclination of the shutter fins 62 is changed so that the external air A is introduced into the introduction holes 38 in a detected traveling direction. However, the present disclosure is not limited to this, and the introduction holes 38 may be brought into the opened state in a case where cooling is just required, without detecting a traveling direction. Further, the shutter fins 62 may be inclined only by a predetermined angle in the opened state.

Further, the shutter fin 62 is configured to pivot by the pivot shaft 64 provided in the central part of the shutter fin 62 in the vehicle front-rear direction. However, the present disclosure is not limited to this. Such a configuration may be employed that pivot shafts are provided in opposite end portions of the shutter fin 62 in the vehicle front-rear direction such that the pivot shafts are removable from the shutter fin so that the introduction hole 38 is brought into the opened state, or other configurations may be employed.

Third Embodiment

Next will be described a vehicle cooling structure according to a third embodiment of the present disclosure with reference to FIGS. 7, 8. Note that a constituent that is basically the same as a constituent described in the first embodiment has the same reference sign as the constituent in the first embodiment, and the description thereof is omitted.

Figure 7:
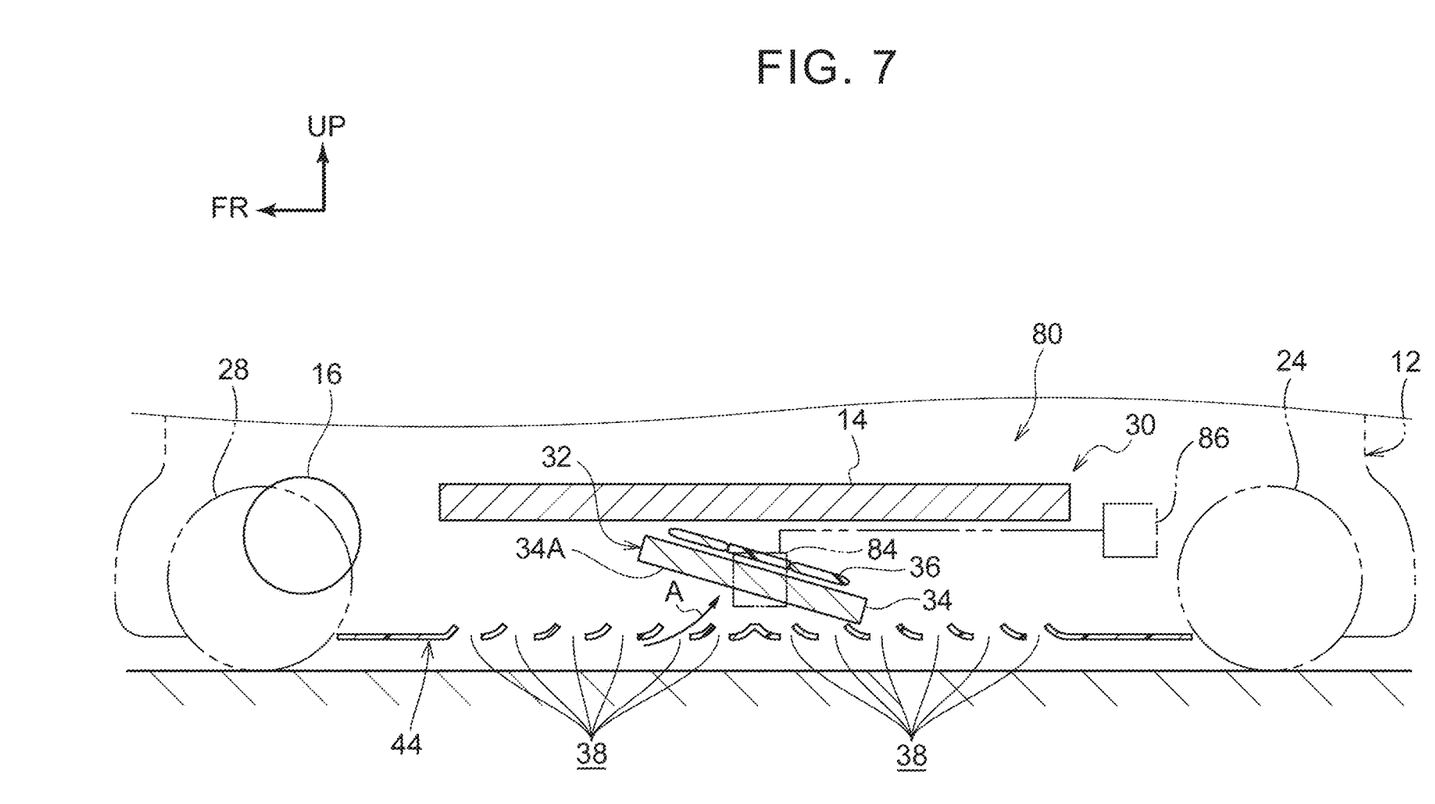
FIG. 7 is a schematic sectional view illustrating a case where a vehicle having a vehicle cooling structure according to a third embodiment travels toward the first side in the vehicle front-rear direction.

As illustrated in FIG. 7, a basic configuration of a vehicle cooling structure 80 according to the third embodiment is similar to that of the first embodiment and the vehicle cooling structure 80 has such a feature that the radiator unit 32 is inclined.

A battery unit 82 is provided in the vehicle floor portion, that is, below the floor panel in the vehicle up-down direction and between the right and left rockers 18. The battery unit 82 includes the battery 14, the radiator unit 32 (see FIG. 2), an inclined portion 84, and an inclination controlling portion 86.

The inclined portion 84 includes a drive mechanism (not shown) and is configured to cause the radiator unit 32 to pivot around a pivot shaft (not shown) with its axial direction being along the vehicle width direction, the pivot shaft being provided in a central part of the radiator unit 32 in the vehicle front-rear direction.

Figure 8:
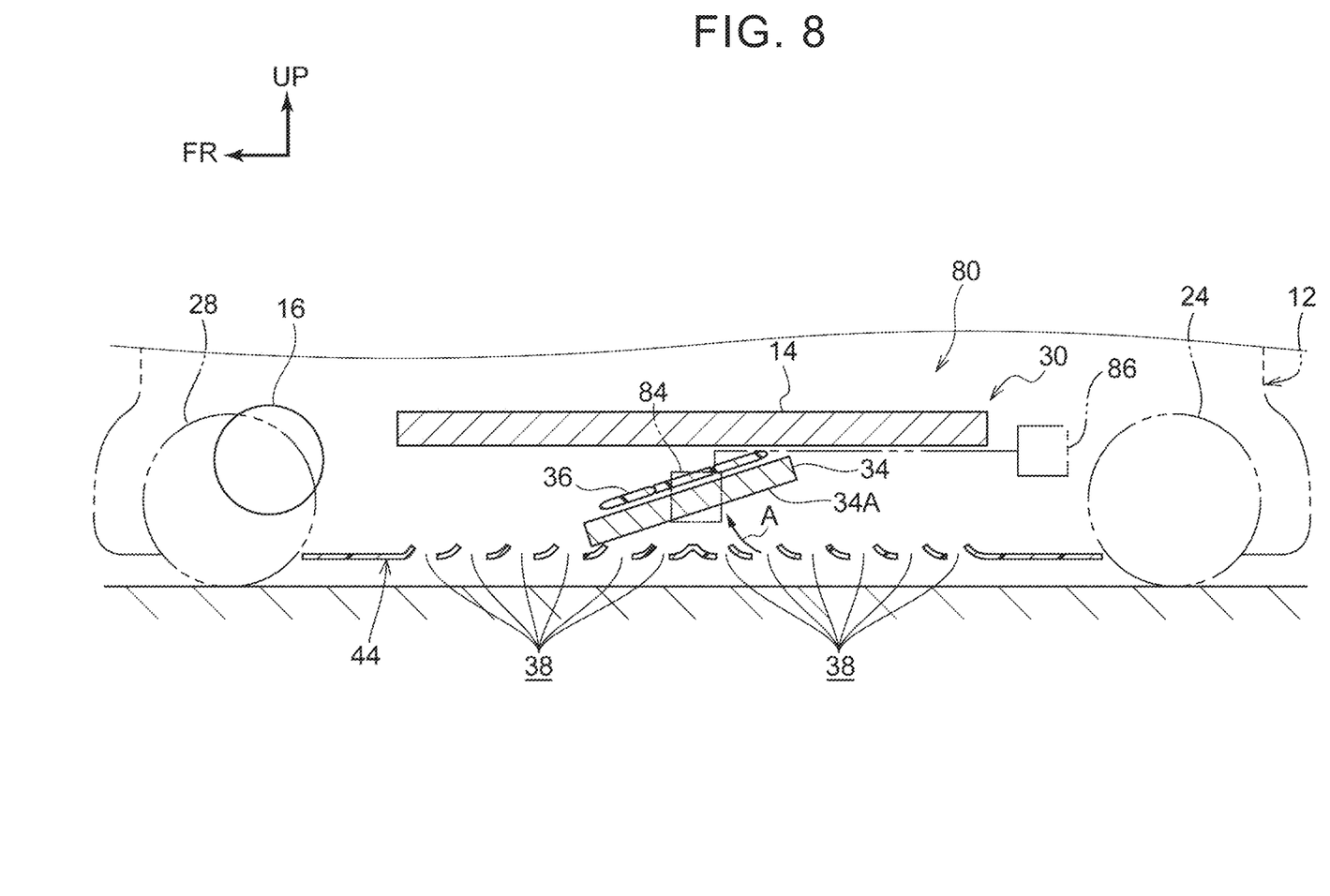
FIG. 8 is a schematic sectional view illustrating a case where the vehicle having the vehicle cooling structure according to the third embodiment travels toward the second side in the vehicle front-rear direction.

The inclined portion 84 is communicably connected to the inclination controlling portion 86, and the inclination controlling portion 86 controls the inclined portion 84 such that the radiator 34 is switched between a horizontal state (see FIG. 2) in which the heat-exchanging portion 34A is along the horizontal direction and an inclined state (see FIGS. 7, 8). Further, the inclination controlling portion 86 is communicably connected to the driving shaft rotation number sensor (not shown), and the inclination controlling portion 86 determines to which side in the vehicle front-rear direction the vehicle 12 travels. Further, the inclination controlling portion 86 is communicably connected to respective temperature sensors configured to detect respective temperatures of the battery 14 and the motor unit 16 and acquires the temperatures of the battery 14 and the motor unit 16.

Control on Inclined Portion

When at least one of the temperatures of the battery 14 and the motor unit 16 is a predetermined temperature or less, the inclination controlling portion 86 determines that cooling is unnecessary, and the inclination controlling portion 86 brings the radiator 34 into the horizontal state (see FIG. 2).

In the meantime, when a predetermined condition is satisfied, that is, at least one of the temperatures of the battery 14 and the motor unit 16 is the predetermined temperature or more, the inclination controlling portion 86 determines that cooling is necessary and inclines the radiator 34. More specifically, in a case where the vehicle 12 travels forward in the vehicle front-rear direction, the inclination controlling portion 86 brings the radiator 34 into the inclined state where the radiator 34 is inclined in a direction inclined downward in the vehicle up-down direction toward the rear side in the traveling direction (the rear side in the vehicle front-rear direction) as illustrated in FIG. 7. Hereby, the external air A outside the vehicle 12 traveling forward in the vehicle front-rear direction as the traveling direction easily hits the radiator 34 efficiently.

Further, in a case where the vehicle 12 travels rearward in the vehicle front-rear direction, the inclination controlling portion 86 brings the radiator 34 in the inclined state where the radiator 34 is inclined in a direction inclined downward in the vehicle up-down direction toward the rear side in the traveling direction (the front side in the vehicle front-rear direction) as illustrated in FIG. 8. Hereby, the external air A outside the vehicle 12 traveling rearward in the vehicle front-rear direction as the traveling direction easily hits the radiator 34 efficiently.

Operations and Effects of Third Embodiment

Next will be described operations and effects of the present embodiment.

In the above configuration, the vehicle cooling structure 80 is configured in a similar manner to the vehicle cooling structure 10 of the first embodiment except that the radiator 34 is inclined. Accordingly, this configuration can yield the same effect as that of the first embodiment. Further, the vehicle cooling structure 80 includes: the inclined portion 84 configured to incline, around the axial direction, the radiator 34 in which the heat-exchanging portion 34A having a wall shape is placed along the horizontal direction, the axial direction being along the vehicle width direction; and the inclination controlling portion 86 configured to control the inclined portion 84 such that the radiator 34 is inclined downward in the vehicle up-down direction toward the front side in the vehicle front-rear direction when cooling is necessary. That is, the direction of the heat-exchanging portion 34A nears a direction perpendicular to the direction of the external air A when the vehicle 12 travels forward in the vehicle front-rear direction. Accordingly, by inclining the radiator 34 when cooling is necessary, a more amount of the external air A hits the heat-exchanging portion 34A of the radiator 34 while the vehicle travels, so that heat-exchange can be performed efficiently. This makes it possible to improve cooling performance.

Further, the inclination controlling portion 86 controls the inclined portion 84 such that the radiator 34 is inclined downward in the vehicle up-down direction toward the front side in a detected traveling direction. Hereby, even when the traveling direction changes, a more amount of the external air A can hit the radiator 34 while the vehicle travels. That is, even in a case where the vehicle 12 that can travel to either side in the vehicle front-rear direction travels to either side in the vehicle front-rear direction, it is possible to perform heat-exchange more efficiently. Hereby, it is possible to improve cooling performance regardless of the traveling direction of the vehicle 12.

Further, when the inclination controlling portion 86 determines that cooling is unnecessary, the inclination controlling portion 86 brings the radiator 34 into the horizontal state. This allows the distance from the radiator 34 to a road surface to be larger than that in the inclined state. That is, it is possible to keep to a minimum a state where the radiator 34 easily interferes with an obstacle on the road surface.

Note that, in the third embodiment, the inclination controlling portion 86 is configured to control the inclined portion 84 such that the radiator 34 is inclined downward in the vehicle up-down direction toward the rear side in a detected traveling direction. However, the present disclosure is not limited to this, and the inclination controlling portion 86 may be configured to incline the radiator 34 only downward in the vehicle up-down direction toward the rear side in the vehicle front-rear direction without detecting the traveling direction.

Further, the radiator 34 is configured to be inclined by the inclined portion 84. However, the present disclosure is not limited to this, and the shutter fins 62 of the second embodiment may be provided in the introduction holes 38 so that the radiator 34 is controlled together with the shutter fins 62.

Further, in the first to third embodiments, the motor unit 16 is provided in the space S between the front side members 26. However, the present disclosure is not limited to this. A configuration in which the motor unit 16 is provided in a space between the rear side members 20 or a configuration in which the motor unit 16 is provided both in the space S between the front side members 26 and in the space between the rear side members 20 may be employed. Further, the motor unit 16 may be provided in a part other than the space S between the front side members 26, like a so-called in-wheel type motor.

Further, the battery 14 is configured to be cooled down by coolant. However, the present disclosure is not limited to this, and a fuel cell stack or other objects provided in the vehicle may be configured to be cooled down. Further, the battery 14 and the motor unit 16 are configured to be cooled down. However, the present disclosure is not limited to this, and only the battery 14 may be cooled down.

Further, the radiator 34 is configured such that the heat-exchanging portion 34A is placed along the horizontal direction. However, the present disclosure is not limited to this, and the heat-exchanging portion 34A may be placed along other directions such as the vehicle up-down direction. Further, the battery 14 and the radiator unit 32 are provided in the vehicle floor portion. However, the present disclosure is not limited to this, and the battery 14 and the radiator unit 32 may be placed at other positions such as a power unit room.

The embodiments of the present disclosure have been described above, but the present disclosure is not limited to the above description and may be modified in various ways and performed as long as the modifications are not beyond the gist of the present disclosure.

What is claimed is:

1. A vehicle cooling structure comprising:
    a power supply portion provided in a vehicle and configured to supply electric power;
    an under panel which constitutes a bottom face of the vehicle and has introduction holes; and
    a heat exchanger provided near the power supply portion and including a heat-exchanging portion having a wall shape, the heat-exchanging portion being configured to perform heat-exchange between coolant for cooling down the power supply portion and external air taken in through the introduction holes,
    wherein the power supply portion and the heat exchanger are parallel to the under panel and overlap each other in a vehicle up-down direction.

2. The vehicle cooling structure according to claim 1, wherein
    the power supply portion is configured to supply electric power to an electric machine provided in the vehicle and configured to drive the vehicle, and
    the heat exchanger is configured to perform heat-exchange between the external air and the coolant that cools down the electric machine as well as the power supply portion.

3. The vehicle cooling structure according to claim 1, wherein the power supply portion and the heat exchanger are placed inwardly in a vehicle width direction from a pair of right and left frame members constituting a framework of the vehicle and extending in a vehicle front-rear direction.

4. The vehicle cooling structure according to claim 1, wherein the heat exchanger is formed integrally with the power supply portion.

5. The vehicle cooling structure according to claim 1, further comprising:
   shutter fins configured to open and close the introduction holes; and
   a controlling portion configured to control the opening and closing of the shutter fins.

6. The vehicle cooling structure according to claim 5, wherein
   the controlling portion is configured to detect a traveling direction of the vehicle and control the opening and closing of the shutter fins so that the external air is introduced into the introduction holes in the traveling direction thus detected.

7. The vehicle cooling structure according to claim 1, further comprising:
   an air-blow fan located between the power supply portion and the heat exchanger in the vehicle up-down direction.

8. The vehicle cooling structure according to claim 1, wherein
   the under panel includes:
       first wind-guide inclined portions inclined upward in the vehicle up-down direction toward a rear side of the vehicle in a vehicle front-rear direction; and
       second wind-guide inclined portions inclined upward in the vehicle up-down direction toward a front side of the vehicle in the vehicle front-rear direction.

9. The vehicle cooling structure according to claim 8, wherein
   the heat exchanger is located over the first wind-guide inclined portions and the second wind-guide inclined portions in the vehicle up-down direction.

10. The vehicle cooling structure according to claim 9, wherein
    the first wind-guide inclined portions and the second wind-guide inclined portions are configured to direct the external air taken in through the introduction holes toward the heat exchanger.

11. The vehicle cooling structure according to claim 10, wherein
    all of the first wind-guide inclined portions are located in front of all of the second wind-guide inclined portions in the vehicle front-rear direction.

12. The vehicle cooling structure according to claim 11, wherein
    one of the first wind-guide inclined portions is adjacent to and in direct contact with one of the second wind-guide inclined portions.

13. The vehicle cooling structure according to claim 12, wherein
    said one of the first wind-guide inclined portions and said one of the second wind-guide inclined portions overlap the heat exchanger and the power supply portion in the vehicle up-down direction.

14. The vehicle cooling structure according to claim 13, wherein
    said one of the first wind-guide inclined portions and said one of the second wind-guide inclined portions form an upside-down V-shape.

15. The vehicle cooling structure according to claim 14, further comprising:
    an air-blow fan located between the power supply portion and the heat exchanger in the vehicle up-down direction.

16. The vehicle cooling structure according to claim 15, wherein
    the air-blow fan is configured to generate an upward air flow from the heat exchanger toward the power supply portion.

17. The vehicle cooling structure according to claim 16, wherein
    the air-blow fan is integrally formed with the heat exchanger.

18. The vehicle cooling structure according to claim 16, wherein
    the air-blow fan is integrally formed with the heat exchanger via a fan shroud.

* * * * *